Jan. 24, 1967  J. WIGINGTON  3,300,700
SPEED CONTROL CIRCUIT FOR SERIES MOTORS
Filed July 31, 1964

INVENTOR.
JERRY WIGINGTON
BY
ATTORNEY

WITNESS

United States Patent Office  3,300,700
Patented Jan. 24, 1967

3,300,700
SPEED CONTROL CIRCUIT FOR SERIES MOTORS
Jerry Wigington, Pickens, S.C., assignor to The Singer Company, New York, N.Y., a corporation of New Jersey
Filed July 31, 1964, Ser. No. 386,578
3 Claims. (Cl. 318—246)

This invention relates to circuits for controlling the speed of series commutator motors fed from an A.C. supply through half-wave semiconductor controlled rectifiers and more particularly to such circuits in which special means are provided for matching the time-functional shape of a control or reference voltage to that of the armature speed voltage to obtain the proper gate firing voltages for the rectifier responsively to changing speed.

According to the present invention a back diode rectifier is placed across the field winding to maintain the forward current in the field when the controlled rectifier is nonconducting. This establishes an armature speed voltage which decreases exponentially with time as determined by the time constant $R/L$ of the field winding. To match the reference voltage to this exponentially decreasing feedback speed voltage, a capacitor is charged substantially to the peak value of the A.C. source voltage during each negative half-cycle and is discharged at a rate controlled by an RC circuit with a potentiometer for adjusting the level of the reference voltage for setting the speed.

It is an object of this invention to provide novel circuit means for adjusting and regulating the speed of a series commutator motor supplied from an A.C. voltage through a single semiconductor controlled rectifier.

It is a further object of this invention to provide a predetermined time-functional shape for the reference or control voltage which is combined with a similarly shaped feedback armature speed voltage to control the firing of a semiconductor controlled rectifier for supplying current to a series commutator motor from an A.C. supply.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
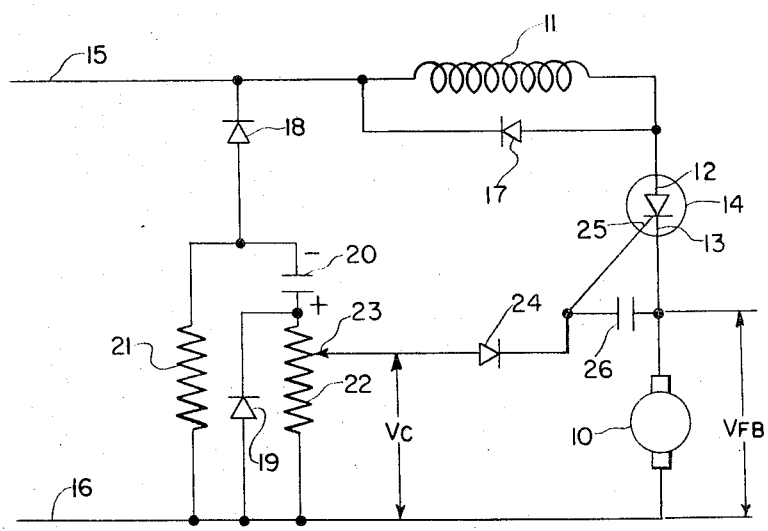

In the drawings, FIG. 1 is a circuit diagram illustrating an embodiment of the invention.

Figure 2:
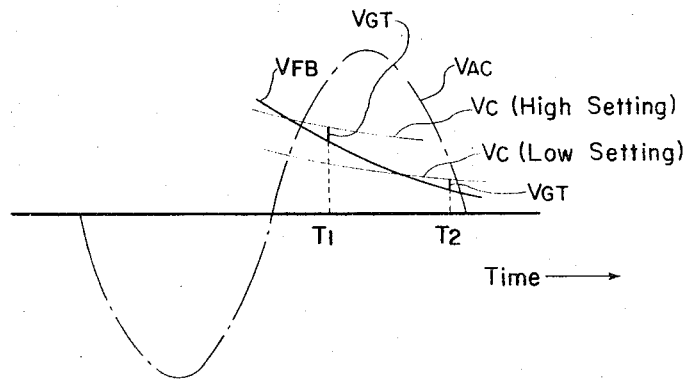

FIG. 2 is a diagram illustrating the time functional shape and relation of certain voltages in the circuit of FIG. 1.

Referring to FIG. 1, a series commutator motor has an armature winding 10 and a field winding 11 connected in series with an anode 12 and a cathode 13 of a semiconductor controlled rectifier 14 and in series with leads 15 and 16, to which leads an A.C. voltage source (not shown) may be applied.

A back-rectifier diode 17 is connected across the field winding 11 with polarity as shown. A series circuit comprising diodes 18, 19, and capacitor 20 is connected to leads 15 and 16 and provides means for charging capacitor 20 substantially to the peak value of the A.C. voltage applied to leads 15, 16 on the half-cycles when lead 16 is positive with respect to lead 15.

A fixed resistor 21 and a potentiometer resistance 22 are connected to capacitor 20 to form a closed RC loop and provide a discharge circuit for the capacitor 20. A slider 23 of potentiometer 22 is connected through a diode 24 to gate 25 of the controlled rectifier 14. A capacitor 26 may be connected across the gate 25 and cathode 13 of the controlled rectifier 14 to render the gate relatively insensitive to transient voltages from the commutator as is well understood in this art.

Operation

It will be understood that, as some time early in the negative half-cycle of the A.C. voltage, VAC, as shown in FIG. 2, the controlled rectifier 14 reverts to its blocking state and current to the armature will be cut off. However, current will continue to flow in a forward direction in the field winding due to the self-induced voltage of the field inductance and the path provided by the back diode 17. This action is well understood in the prior art. This field current will decay at an exponential rate governed by the time constant, $R/L$, where R is the resistance and L is the inductance of the field winding 11. The armature winding 10 rotating in the field excited by this decaying current will generate a feedback armature speed voltage, VFB, which, for a given speed, will have the exponentially decreasing shape shown in FIG. 2.

During the negative half-cycle of VAC, when lead 16 is positive with respect to lead 15, the diodes 18 and 19 are of a polarity to charge the capacitor 20 substantially to a voltage equal to the peak value of VAC and of the polarity indicated in FIG. 1. As soon as the diodes 18 and 19 are back biased, the capacitor 20 starts to discharge through the resistor 21 and the resistance of potentiometer 22 and the exponentially decreasing discharge current flowing through 22 establishes the reference or control voltage VC as shown in FIG. 2. The RC value of the discharge circuit fixes the slope of VC and this is purposely made to be of somewhat less negative slope than that of VFB which has been fixed by the $R/L$ value of the field winding 11 so that a positive gate firing voltage VGT may be obtained during the positive half-cycle as seen in FIG. 2.

The level of the control voltage VC may be adjusted by positioning the slider 23 so that, for a high setting, firing occurs early in the cycle such as at $T_1$; and, for a low setting near the bottom of potentiometer, firing occurs late in the cycle such as at $T_2$. It is obvious that, by making the slope of VC closer to the slope of VFB, a very sensitive control of speed can be obtained and this function is defined in this specification as matching the time functional shape of the control voltage to that of the armature speed voltage.

It is of course important that the shape of the control voltage VC be accurately repeatable from cycle to cycle for a given speed setting and this is assured by the fact that the capacitor 20 is always charged in each alternate cycle to a voltage substantially equal to the peak of the A.C. source voltage and begins its discharge at the same point in said cycle.

Having thus described the nature of the invention, what I claim herein is:

1. A circuit for controlling the speed of a commutator motor having series connected armature and field windings fed from an A.C. voltage source comprising; a solid state controlled rectifier having an anode, a cathode and a gate; means connecting the armature winding, the field winding, the anode and the cathode in series with the voltage source; a diode connected across said field winding and of a polarity to permit forward current to flow in said field winding after the controlled rectifier stops conducting to provide an armature speed voltage having an exponentially decreasing time function; a capacitor; means for charging said capacitor during negative half cycles of the source voltage to a voltage substantially equal to the peak value of the A.C. source voltage; means for discharging said capacitor during positive half cycles of the source voltage through a resistance to provide a positive control voltage having an exponentially decreasing time function; means for adjusting the level of said control voltage; means for combining the control voltage with the armature speed voltage to provide a gate firing voltage; and means for applying said gate firing voltage to the gate and cathode to control the firing of said controlled rectifier.

2. A circuit for controlling the speed of a commutator motor having series-connected armature and field windings fed from an A.C. voltage source comprising; a solid state controlled rectifier having an anode, a cathode and a gate; means connecting the armature winding, the field winding, the anode and the cathode in series with the voltage source; a diode connected in shunt with said field winding and of a polarity to permit the flow of forward current in said field winding after the controlled rectifier stops conducting during each cycle of the source voltage to provide an armature speed voltage having an exponentially decreasing time function; a capacitor; means operative during alternate half-cycles of the source voltage to charge said capacitor to a voltage substantially equal to the peak value of the source voltage; means for discharging said capacitor during positive half cycles of the source voltage through a predetermined resistance to provide a positive control voltage having an exponentially decreasing time function with a predetermined slope relation to said armature speed voltage; means for adjusting the level of said control voltage; means for combining the control voltage with the armature speed voltage to provide a gate firing voltage; and means for applying said gate firing voltage to the gate and cathode to control the firing of said controlled rectifier.

3. A circuit for controlling the speed of a commutator motor having series-connected armature and field windings fed from an A.C. voltage source comprising; a solid state controlled rectifier having an anode, a cathode, and a gate; means connecting the armature winding, the field winding, the anode and the cathode in series with the source voltage; a diode connected in shunt with said field winding and having its polarity reversed with respect to that of said controlled rectifier to provide controlled excitation of the field winding during the nonconduction periods of said controlled rectifier and production of an armature speed voltage having an exponentially decreasing time function; a capacitor; means including two diodes in series with said capacitor and the source voltage for charging said capacitor to a voltage substantially equal to the peak value of the source voltage during alternate half-cycles of the source voltage; means including a resistance for discharging said capacitor during positive half cycles of the source voltage to provide a positive control voltage having an exponentially decreasing time function of less negative slope than said armature speed voltage; means for adjusting the level of the control voltage; means for combining the control voltage with the armature speed voltage to provide a gate firing voltage; and means for applying said gate firing voltage to the gate and cathode to control the firing of said controlled rectifier.

References Cited by the Examiner
UNITED STATES PATENTS

| | | | |
|---|---|---|---|
| 3,165,688 | 1/1965 | Gutzmiller | 318—246 |
| 3,181,048 | 4/1965 | Ficek et al. | 318—246 |
| 3,195,029 | 7/1965 | Gilbreath | 318—246 |

ORIS L. RADER, *Primary Examiner.*

B. DOBECK, *Assistant Examiner.*